(12) United States Patent
Tamkin et al.

(10) Patent No.: US 11,178,216 B2
(45) Date of Patent: *Nov. 16, 2021

(54) GENERATING CLIENT APPLICATIONS FROM SERVICE MODEL DESCRIPTIONS

(71) Applicant: Amazon Technologies, Inc., Seattle, WA (US)

(72) Inventors: Preston Alan Tamkin, Seattle, WA (US); Christopher David Byskal, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,640

(22) Filed: Jun. 4, 2019

(65) Prior Publication Data

US 2019/0356725 A1 Nov. 21, 2019

Related U.S. Application Data

(63) Continuation of application No. 15/897,991, filed on Feb. 15, 2018, now Pat. No. 10,320,890, which is a continuation of application No. 14/620,801, filed on Feb. 12, 2015, now abandoned.

(51) Int. Cl.
*H04L 29/08* (2006.01)
*H04L 29/06* (2006.01)

(52) U.S. Cl.
CPC .............. *H04L 67/10* (2013.01); *H04L 67/02* (2013.01); *H04L 67/34* (2013.01); *H04L 67/42* (2013.01)

(58) Field of Classification Search
CPC ......... H04L 67/02; H04L 67/10; H04L 67/34; H04L 67/42
See application file for complete search history.

(56) References Cited

U.S. PATENT DOCUMENTS

| | | | | |
|---|---|---|---|---|
| 2005/0049929 | A1* | 3/2005 | Hsu ........................ | G06Q 20/02 705/64 |
| 2014/0033170 | A1* | 1/2014 | Nimashakavi ........ | G06F 16/972 717/120 |
| 2015/0081798 | A1* | 3/2015 | Lee ......................... | H04L 67/10 709/205 |
| 2016/0164953 | A1* | 6/2016 | Hristov ................... | H04W 4/60 709/203 |

OTHER PUBLICATIONS

Office Action for U.S. Appl. No. 15/897,991, dated Oct. 9, 2018, Tamkin et al, "Generating Client Applications From Service Model Descriptions", 25 pages.

(Continued)

*Primary Examiner* — Gil H. Lee
(74) *Attorney, Agent, or Firm* — Lee & Hayes, P.C.

(57) ABSTRACT

Technologies are disclosed herein for generating a stand-alone client application for communicating with a network service based on a proprietary communication protocol. A service model description may be parsed to identify resources associated with the network service. Thereafter, executable program code may be generated describing the resources as a set of basic commands and pathnames. The program code may be packaged as the stand-alone client application without inclusion of program code for communication via the proprietary communication protocol.

20 Claims, 7 Drawing Sheets

(56) References Cited

OTHER PUBLICATIONS

Office Action for U.S. Appl. No. 14/620,801, dated Nov. 16, 2017, Tamkin, "Generating Client Applications from Service Model Descriptions", 18 pages.
Office Action for U.S. Appl. No. 14/620,801, dated Feb. 9, 2017, Tamkin, "Generating Client Applications from Service Model Descriptions", 18 pages.
Office Action for U.S. Appl. No. 15/897,991, dated Apr. 19, 2018, Tamkin, "Generating Client Applications from Service Model Descriptions", 23 pages.

* cited by examiner

GENERATING CLIENT APPLICATIONS FROM SERVICE MODEL DESCRIPTIONS

CROSS REFERENCE TO RELATED APPLICATIONS

This application is a continuation of, and claims priority to, U.S. patent application Ser. No. 15/897,911, entitled "GENERATING CLIENT APPLICATIONS FROM SERVICE MODEL DESCRIPTIONS", filed on Feb. 15, 2018, which claims priority to U.S. patent application Ser. No. 14/620,801, entitled "Generating Client Applications from Service Model Descriptions", filed on Feb. 12, 2015, the contents of which are incorporated fully herein by reference.

BACKGROUND

Generally, computing systems may employ a number of software components and network services conforming to one of any available communication structure, protocol, or model. Additionally, service provider networks may offer many services conforming to any desired proprietary communication protocol. Furthermore, client applications may exist outside of a service provider network. The client applications, such as client applications implemented by third parties, may attempt to communicate with one or more network services within the service provider network. If a client application attempts to communicate directly with a network service, the proprietary communication protocol should at least generally be adhered to by the client application in order to establish communication.

However, if the proprietary communication protocol is not well-implemented by the client application, the client application may not be able to communicate with the associated network service correctly. Furthermore, if the proprietary communication protocol includes information that the service provider network desires to keep secure, full documentation of the proprietary communication protocol may not be desirable.

The disclosure made herein is presented with respect to these and other considerations.

DETAILED DESCRIPTION

Figure 1A:
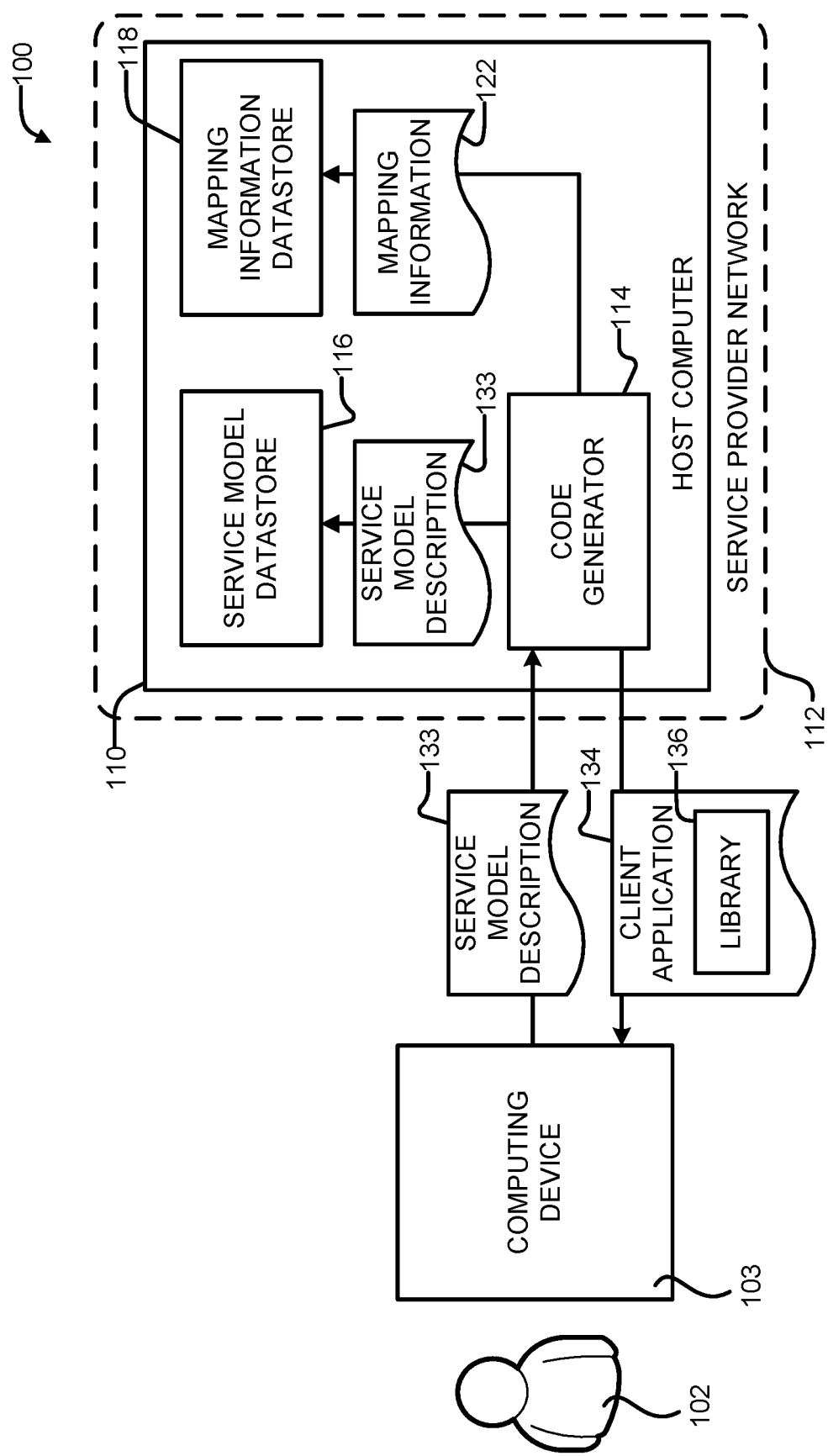
FIG. 1A is a software architecture diagram showing aspects of an illustrative computing system for generating client applications from service model descriptions, including several software and hardware components disclosed herein.

The following detailed description is directed to technologies for generating client applications from service model descriptions. Service model descriptions may be data files describing different resources necessary to implement a network service. Additionally, service model descriptions may include a description of a communications interface, data types, and/or other components necessary for deploying a network service based on the service model description. Through an implementation of the various technologies disclosed herein, a program code ("code") generation service can be deployed in a computing system. The code generator component can be centrally deployed to be in communication with a plurality of network services ("services"), or alternatively, may be co-located with one or more services on a host computer. The code generator component is configured to generate an executable client application, for example a stand-alone application, based on a service model description, for deployment and utilization at the computing system.

In one implementation, the code generator component is configured to parse the service model description to retrieve representations of software components described by the service model description. Thereafter, the code generator component may determine the particular network resources that are required to enable operation of the described software components. The code generator component may then generate code configured to describe or represent the particular network resources. The code generator component may also create mapping information describing how particular functions of the network service based on the service model description relate directly to each of a set of basic functions not described by the service model description. Accordingly, the mapping information includes one or more mappings between the set of commands or verbs and the resources associated with functions provided by the network service. The set of basic functions may include basic Hypertext Transfer Protocol (HTTP) functions or "verbs", for example.

The code generator component can subsequently assemble or package the generated code as a client application based on HTTP. The client application, which does not utilize proprietary communications protocols, can then be provided for execution on a client computer. The client application is configured to communicate with the web service based on the service model description using the set of basic functions. For example, through an implementation of the various technologies disclosed herein, a management service can be deployed in a computing system.

The management service is configured to facilitate communication between the client application and the network service through manipulation of requests made by the client application based on the mapping information and the service model description. The manipulated requests may be broken apart into basic functions mapped to the network service, for example, as described in the mapping information. Thereafter, any responses from the web service may be manipulated in reverse, and transmitted to the client application.

For example, a web application, such as a weather application configured to identify weather conditions associated with a desired travel location, may have several resources and functions associated therewith. The weather application may further include a service model description including descriptions of the resources and the functions. Furthermore, a network service configured to provide weather information based on the desired location may be deployed at a service provider network.

As described herein, the code generator component can process the service model description to generate the weather application. Furthermore, the management service, using mapping information provided through the code generator component, may facilitate the passing of information from the network service to the weather application. Thus, the weather application may provide requests for weather information that are processed by the management service and correctly associated with resources of the network service. The requests may be processed natively by the network service with responses being processed by the management service and transmitted to the weather application.

Accordingly, through an implementation of the technologies described herein, client applications may be automatically generated through a code generator component. Additionally, communication may be established and facilitated through processing performed by the management service. Additional details regarding these technologies will be provided below.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. Additionally, the technologies described herein may be practiced in distributed data processing environments, where tasks may be performed by several computing devices that are linked through a communications network. In such a data processing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1A is a software architecture diagram showing aspects of an illustrative computing system 100, including several software and hardware components disclosed herein.

As shown, the system 100 includes a computing device 103 that may be controlled by a user 102. The computing device 103 can include any suitable computing device, including a laptop, desktop, portable computer, and others. The computing device 103 is in operative communication with a host computer 110 operating a service provider network 112, in some implementations. The host computer 110 can also include any suitable computing device, including a server computer, dedicated hardware, and others, and/or may be implemented as a virtual machine.

As shown, the host computer 110 has a code generator component 114 deployed thereon that is configured to receive a service model description 133. The service model description 133 may be provided by the user 102 in some implementations. In other implementations, the service model description 133 is at least partially based on a service model description originating at the service provider network 112.

The code generator component 114 is configured to parse and interpret the service model description 133 to determine one or more software components described therein. For example, the service model description may include a description of a communications interface, data types, and/or other components necessary for deploying a network service based on the service model description 133. Accordingly, the code generator component 114 may determine what resources are necessary for establishing the communications interface, data types, and/or other components. The code generator component 114 may then store the service model description 133 at a service model description datastore 116 for retrieval in the service provider network 112.

Upon determining necessary resources, the code generator component 114 may establish a mapping between basic HTTP functions on particular pathnames describing the resources, and functionality of a network service based on the service model description. The mapping may be one to one, many to one, or any other suitable mapping. Additionally, the mapping may allow relatively complex operations of the network service to be requested by simpler commands, for example HTTP verbs such as GET, PUT, POST, and/or DELETE. For example, the code generator component 114 may create mapping information 122 for storage in mapping information datastore 118 that describes any necessary mappings between received requests and functionality of the network service. Additional details regarding use of the mapping information 122 is described below with reference to FIG. 3.

Upon generation and storage of the mapping information 122, the code generator component 114 may generate a client application 134 based on the HTTP functions and particular pathnames or other identifying information for the necessary resources. For example, the client application 134 may be a standalone client application having computer executable instructions contained therein, that, when executed by a processor of a computing device (such as device 103), cause the computing device to form requests and receive responses based on the HTTP functions and particular pathnames/identifying information for resources. The requests and responses, according to one configuration, may be based on an established communication architecture or library 136. For example, according to at least one implementation, the established communication architecture and library 136 is representational state transfer (REST). Accordingly, the client application 134 is a "RESTful" application conforming to the architectural details for communication between network services established by REST, and using some or all of the basic HTTP verbs of GET, PUT, POST, and DELETE.

Upon generation of the client application 134 and library 136, the code generator component 114 can transmit the client application 134 to the computing device 103 for execution by the computing device 103. As described briefly above, as the client application 134 conforms to REST and established HTTP verbs, the client application 134 may be free of proprietary information related to the network service of which it is associated with. Therefore, the client application 134 can be transmitted and operated by one or more users outside of the service provider network 112 without proprietary information owned by the operator of the service provider network 112 being disseminated to third parties.

Figure 1B:
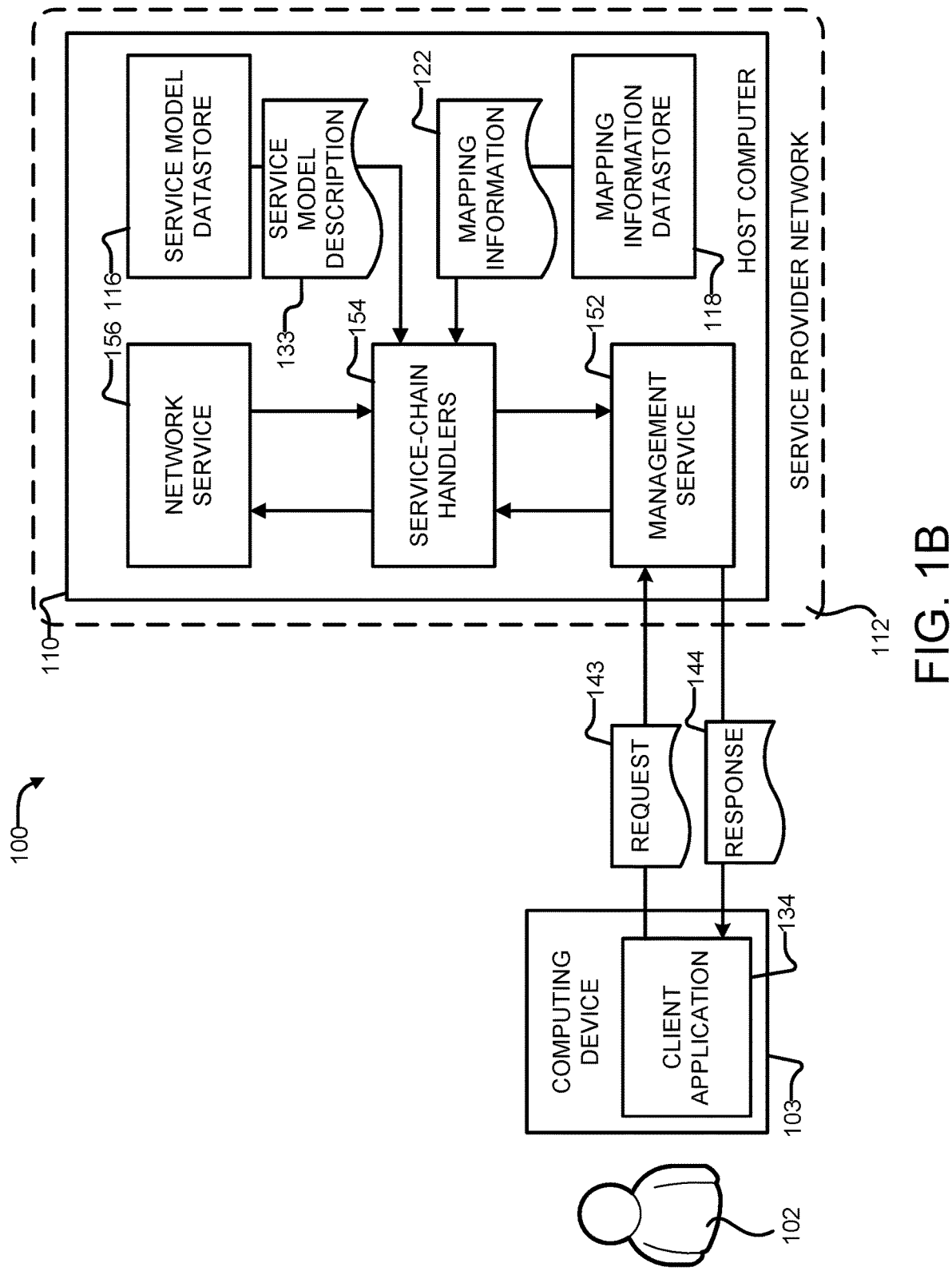
FIG. 1B is a software architecture diagram showing additional aspects of the illustrative computing system of FIG. 1A.

As mentioned above, the mapping information 122 may be used to map the HTTP verbs used by the client application 134 to particular functions of the network service employing the service model description 133. FIG. 1B is a software architecture diagram showing additional aspects of the illustrative computing system 100 and use of the mapping information 122.

As shown in FIG. 1B, the service provider network 112 may further include an management service 152 deployed thereon. The management service 152 may include an orchestrator service in one configuration. The management service 152 is configured to receive an HTTP request 143 from the client application 133. The management service 152 is further configured to direct service chain handlers 154 to associate functions of a network service 156 with the HTTP request 143 based on the mapping information 122. For example, the network service 156 may include a web service such as a service providing access to weather information. Furthermore, the network service 156 may have a number of functions associated therewith. Accordingly, as the HTTP request 143 is received, associated functions of the network service 156 may be called by the service chain handlers 154 in accordance with the particular mappings established by the mapping information 122. Additionally, according to at least one configuration, the network service 156 may be arranged as a final service chain handler of the service chain handlers 154. Subsequent to performing the associated functions, the network service 156 may direct an appropriate response (if necessary) to the service chain handlers 154 such that a response 144 based on the mapping information 122 is presented to the management service 152 for transmission back to the client application.

In this manner, the management service may establish communication between the network service 156 that adheres to the service model description 133, and the client application 134 that adheres to the REST architecture, while limited knowledge of the particular functions of the network service 156 are necessary outside of the service chain handlers 154. Additional details regarding operation of the code generator component 114 and the management service 152 are provided below with reference to FIGS. 2 and 3.

Figure 2:
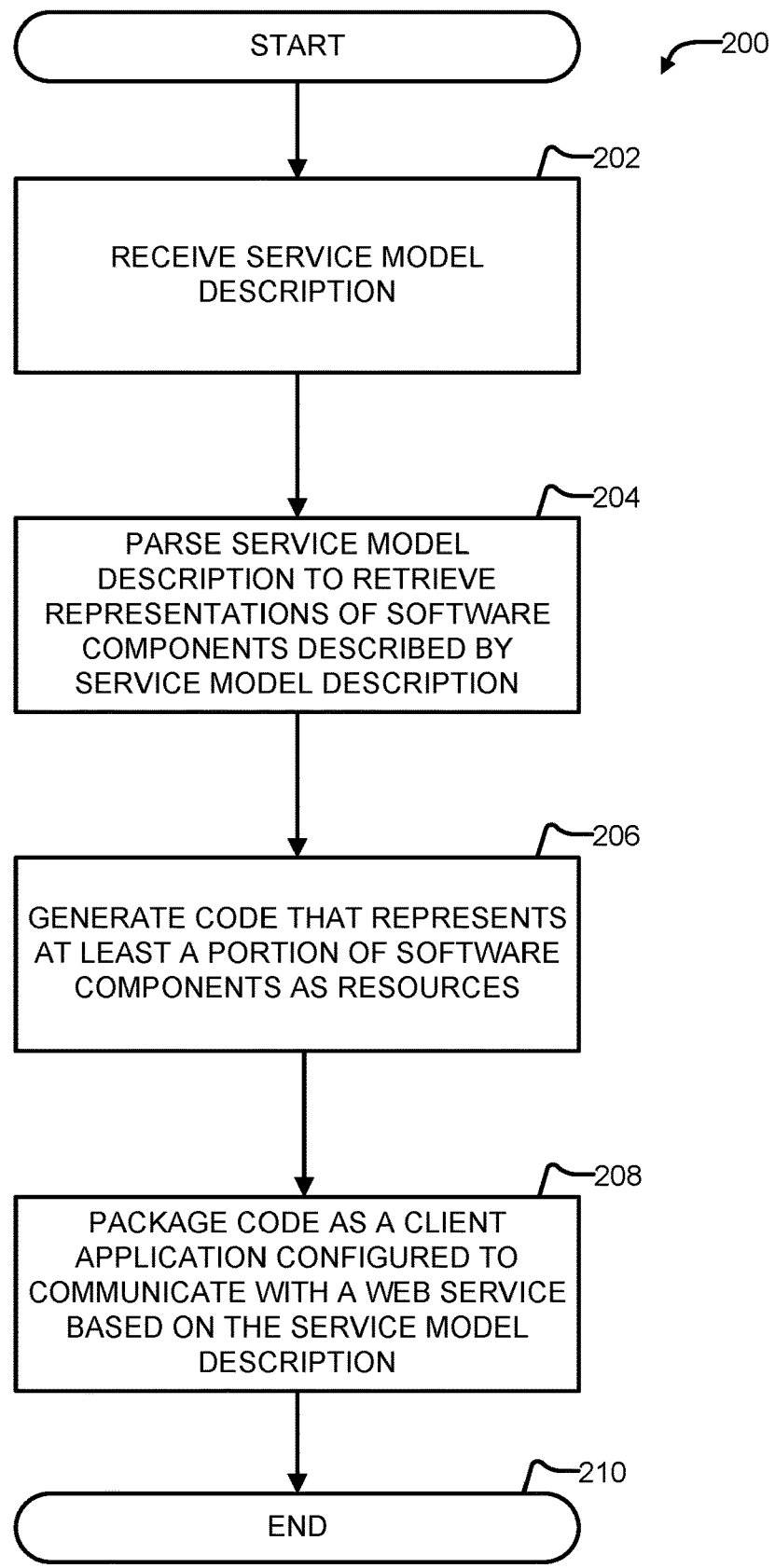
FIG. 2 is a flow diagram illustrating aspects of the operation of a program code generator component that is configured for integration with a service provider network, according to one configuration disclosed herein.

Turning now to FIG. 2, additional details will be provided regarding the technologies presented herein for generating a client application. It should be appreciated that the logical operations described herein with regard to FIG. 2, and the other FIGS., are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 2 is a flow diagram illustrating aspects of the operation of a code generator component 114 that is configured for integration with a computing system, according to one configuration disclosed herein. As shown in FIG. 2, a method 200 of generating a client application 134 from a service model description 133 includes receiving the service model description 133, at block 202. The service model description 133 may be received from a user 102, or from within a service provider network 112. Generally, the host computer 110 may receive the service model description 133 and direct the service model description 133 to the code generator component 114. The service model description 133 may include a description of communication interfaces, data types, and other components of a network service 156 adhering to the service model description 133.

The code generator component 114 parses the service model description 133 to retrieve representations of software components described by the service model description 133, at block 204. The parsing can include identifying particular resources necessary to implement the network service 156. The parsing can further include creating mapping information 122 mapping basic commands, such as HTTP verbs of GET, PUT, POST, and DELETE, to one or more functions of the network service 156. The parsing can further include creating additional mapping information 122 mapping other basic commands and other HTTP verbs to one or more functions of the network service 156. It should be understood that the mapping information 122 can further include mappings between one or more functions of the network service 156 and any necessary commands or HTTP verbs.

Thereafter, the code generator component 114 generates computer-executable code that represents at least a portion of the parsed software components as resources described according to a particular architecture, for example the REST architecture, at block 206. For example, the resources necessary to implement the network service 156 may be described according to the REST architecture such that basic HTTP verbs can be used to access those resources according to the mapping information 122.

Subsequently, the code generator component 114 packages the generated computer-executable code as a client application 134 configured to communicate with the network service 156 based on the HTTP verbs, described resources, and the service model description 133, at block 208, and may cease at block 210. The client application 134 can be packaged as a stand-alone application as described above. For example, the client application 134 may include a console interface, or other user-interface, allowing a user 102 to issue basic HTTP verbs and associated information to the host computer 110 for processing by the management service 152. Thus, as in the example presented above, the client application 134 may include a weather application. The weather application may include the user-interface and may issue the one or more basic commands for retrieving weather information from the network service 156. It should be readily understood that other forms of client applications or even libraries representing how to communicate with the network service 156 are within the scope of this disclosure.

Figure 3:
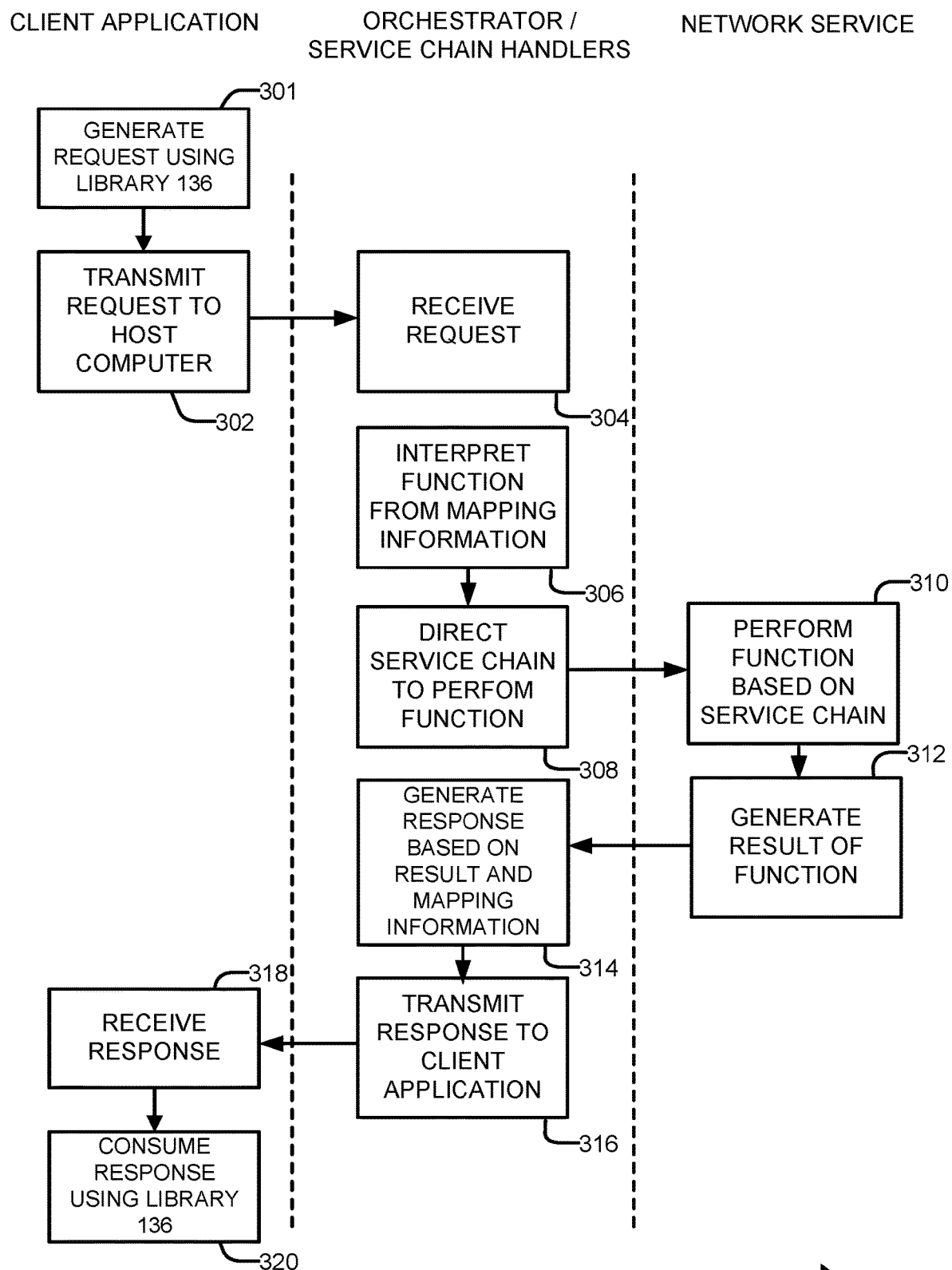
FIG. 3 is a flow diagram illustrating aspects of the operation of an orchestrator service that is configured for integration with a service provider network, according to one configuration disclosed herein.

FIG. 3 is a flow diagram illustrating aspects of the operation of the management service 152, as related to operations performed by the client application 134 and the network service 156, for example a web service. As shown in FIG. 3, the method 300 includes the client application 134 generating the request 143 using the library 136, at block 301. The client application 134 also transmits the request 143 to the management service 152, at block 302. The management service 152 receives the request 143, at block 304.

Thereafter, the management service 152 interprets one or more functions from mapping information 122 to be performed by the network service 156, at block 306. The management service 152 may direct the service chain handlers 308 to acquire information from the service model description 133 necessary to have the associated functions performed by the network service 156, at block 308. Thereafter, based on processing by the service chain handlers, including any necessary throttling, pre- and post-processing, the network service 156 performs the one or more functions at block 310.

The network service 156 may then generate any results of the one or more functions at block 312 and transmit the same to the service chain handlers 154. The service chain handlers 154 and the management service 152 may take up the results and generate a response 144 based on the results and associated mapping information 122. The management service 152 transmits the response at block 316, and the client application receives the response 144, at block 318. Upon receiving the response 144, the client application 134 may consume or otherwise process the response 144 using the library 136, at block 320.

Accordingly, as described above, the management service 152 may facilitate communication based on one or more basic commands. The basic commands can include standard HTTP verbs such as GET, PUT, POST, and DELETE. The management service 152 may facilitate the communication with a network service 156 having a different service model description 133. The standard HTTP verbs can be submitted via requests 143 from a client application 134 that is generated by the code generator component 114.

Thus, particular information related to any proprietary functions performed by the network service 156 do not necessarily have to be transmitted outside of the service provider network 112 to allow communication to be established. Furthermore, through the technologies presented herein, simplified communications based on a RESTful architecture can be facilitated, without necessitating complicated rewriting of the network service 156. As such, utilization of network bandwidth may be reduced, deployment of many web services having different service model descriptions may be made more efficient, and costs associated with maintaining or debugging of communications interfaces may be reduced.

Each of the code generator component 114, the management service 152, the service chain handlers 154, and the network service 156 may be implemented through the service provider network 112. The services may be centrally located or may also be distributed throughout any portions of the service provider network 112.

It should also be appreciated that the components and services described above may be implemented as hardware, as software, or as a combination of hardware and software, to provide functionality similar to that presented above. The services and applications described above might also be executed upon one or more computer systems having computer architectures similar to those described below. Other computer architectures might also be utilized.

Figure 4:
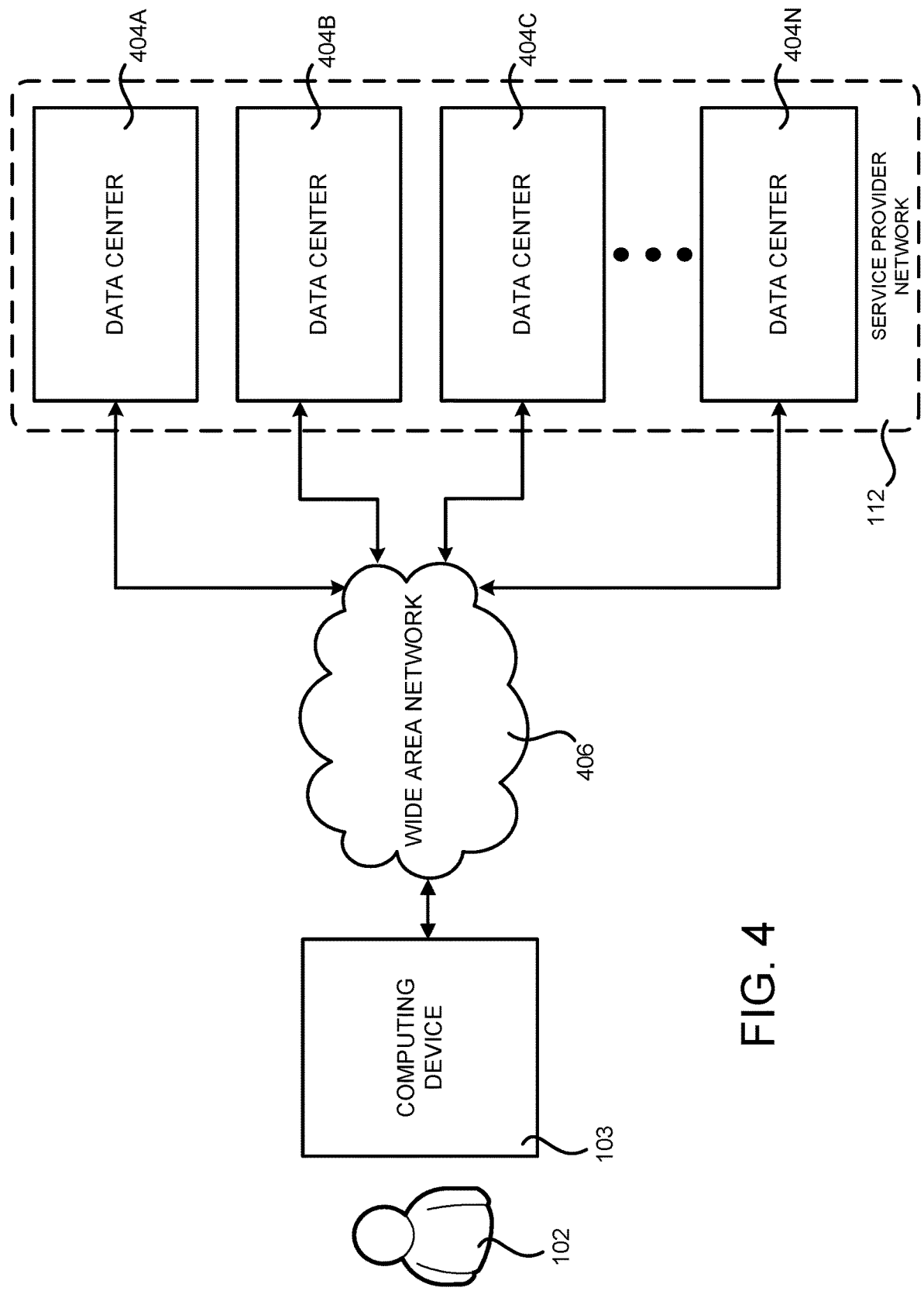
FIG. 4 is a system and network diagram that shows one illustrative operating environment for the embodiments disclosed herein that includes a service provider network that may be configured to provide the functionality described herein.

Hereinafter, computing environments and computer apparatuses that may be configured to use the techniques and procedures described above are described in detail with references to FIGS. 4-6. In particular, FIG. 4 is a system and network diagram that shows one illustrative computing environment for the technologies disclosed herein that includes a service provider network 112. As discussed above, the service provider network 112 can implement one or more services on a host computer 110.

The services are enabled in one implementation by one or more data centers 404A-404N (which may be referred herein singularly as "a data center 404" or in the plural as "the data centers 404). The data centers 404 are facilities utilized to house and operate computer systems and associated components. The data centers 404 typically include redundant and backup power, communications, cooling, and security systems. The data centers 404 might also be located in geographically disparate locations. One illustrative configuration for a data center 404 that implements some of the technologies disclosed herein will be described below with regard to FIG. 5.

The customers and other users of the service provider network 112 may access the computing resources provided by the service provider network 112 over the network 406, such as a WAN. For example, and without limitation, a computing device 103 might access the service provider network 112 by way of the network 406. It should be appreciated that a local-area network (LAN), the Internet, or any other networking topology known in the art that connects the data centers 404 to computing device 103. It should also be appreciated that combinations of such networks might also be utilized. Furthermore, although illustrated as being external to the service provider network 112, it should be further appreciated that the computing device 103 can also be deployed within the service provider network 112.

Figure 5:
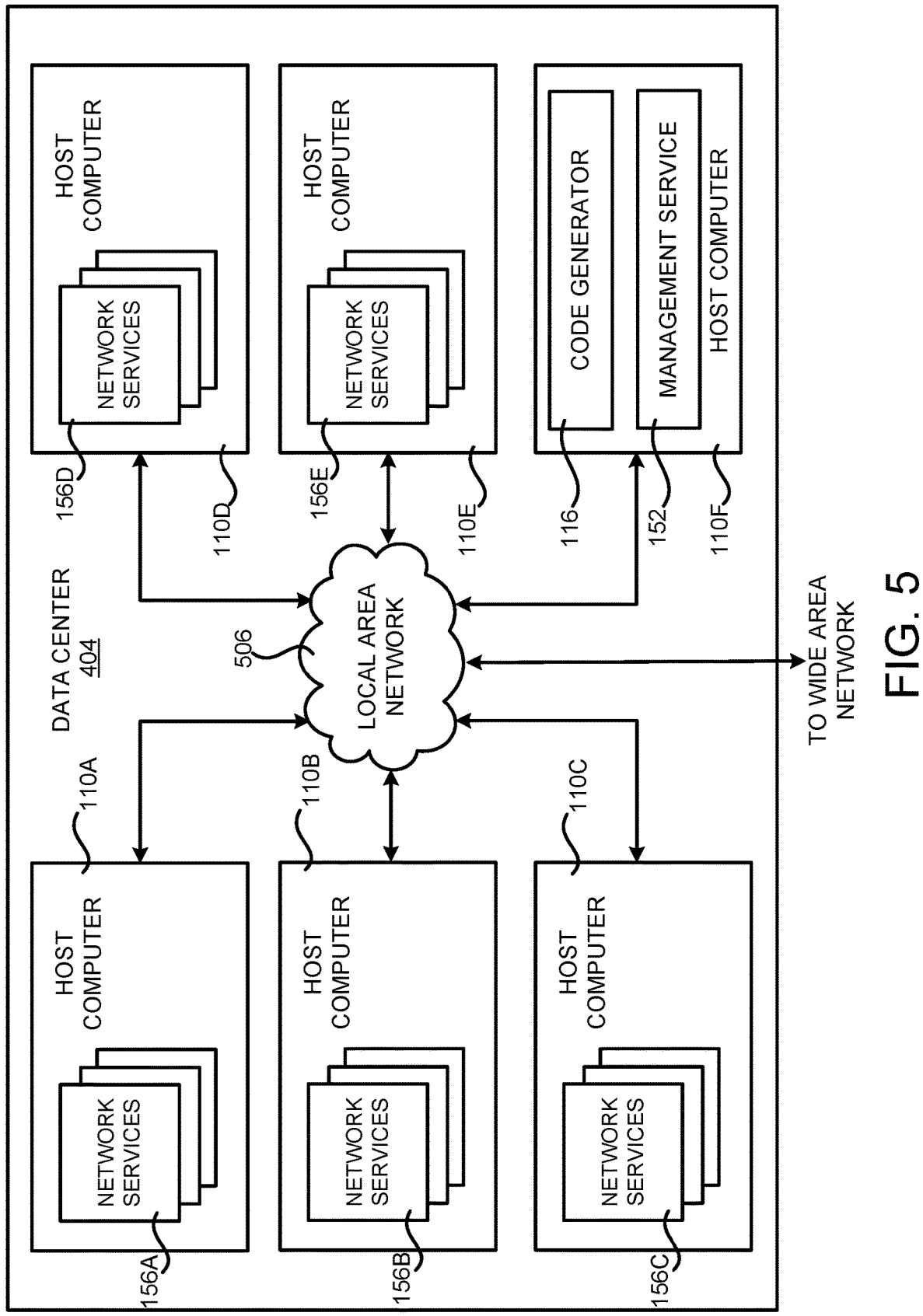
FIG. 5 is a computing system diagram that illustrates one configuration for a data center that implements aspects of the concepts and technologies disclosed herein, according to one configuration disclosed herein.

FIG. 5 is a computing system diagram that illustrates one configuration for a data center 404 that implements aspects of the concepts and technologies disclosed herein, according to one particular configuration disclosed herein. The example data center 404 shown in FIG. 5 includes several host computers 110A-110F (which may be referred to herein singularly as "a host computer 110" or in the plural as "the host computers 110) for providing services 156A-156D. Each of the services 156A-156D may also having individual service model descriptions similar to service model description 133.

The host computers 110 may be standard tower, rack-mount, or blade server computers configured appropriately for implementing the services 156 described herein. Host computers 110 in the data center 404 might also be configured to provide other services, such as the management service 152 described above and potentially others.

The data center 404 shown in FIG. 5 also includes a host computer 110F that may be utilized for executing some or all of the software components described above for generating client applications. For example, and without limitation, the host computer 110F might be configured to execute the code generator component 116. The host computer 110F might also be configured to execute other components for providing some or all of the functionality described herein.

In the example data center 404 shown in FIG. 5, an appropriate LAN 506 is utilized to interconnect the host computers 110A-110F. The LAN 506 is also connected to the network 406 illustrated in FIG. 4. It should be appreciated that the configuration and network topology illustrated in FIGS. 4 and 5 has been greatly simplified and that many more computing systems, software components, networks, and networking devices may be utilized to interconnect the various computing systems disclosed herein and to provide the functionality described above. Appropriate load balancing devices or software modules might also be utilized for balancing a load between each of the data centers 404A-404N, and between each of the server computers 110A-110F in each data center 404. It should be appreciated that the data center 404 described with respect to FIG. 5 is merely illustrative and that other implementations might be utilized.

Figure 6:
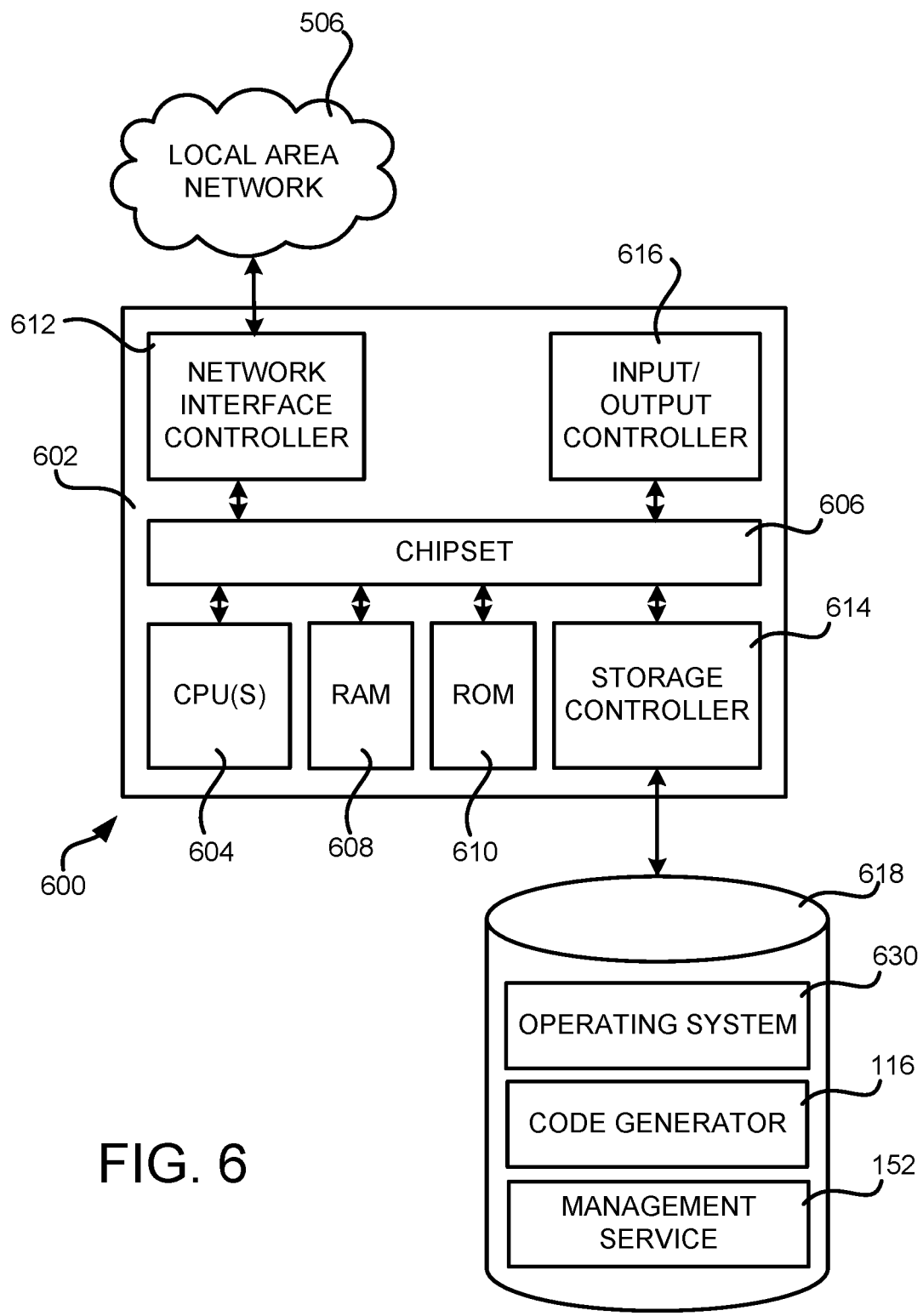
FIG. 6 is a computer architecture diagram showing an illustrative computer hardware architecture for implementing a computing device that might be utilized to implement aspects of the various technologies presented herein.

FIG. 6 shows an example computer architecture for a computer 600 capable of executing program components in the manner described above. The computer architecture shown in FIG. 6 illustrates a conventional server computer, workstation, desktop computer, laptop, tablet, network appliance, e-reader, digital cellular phone, or other computing device, and may be utilized to execute any of the software components presented herein. For example, the computer architecture shown in FIG. 6 may be utilized to execute the methods 200 or 300 described above with regard to FIGS. 2 and 3, respectively. The computer architecture shown in FIG. 6 might also be utilized to implement any of the computing systems described herein.

The computer 600 includes a baseboard 602, or "motherboard," which is a printed circuit board to which a multitude of components or devices may be connected by way of a system bus or other electrical communication paths. In one illustrative configuration, one or more central processing units (CPUs) 604 operate in conjunction with a chipset 606. The CPUs 604 may be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the computer 600. The chipset 606 may further provide an interface to a computer-readable storage medium such as a read-only memory (ROM) 610 or non-volatile RAM (NVRAM) for storing basic routines that help to startup the computer 600 and to transfer information between the various components and devices. The ROM 610 or NVRAM may also store other software components necessary for the operation of the computer 600 in accordance with the various configurations described herein.

The computer 600 may operate in a networked environment using logical connections to remote computing devices and computer systems through a network, such as the local area network 506. The chipset 606 may include functionality for providing network connectivity through a NIC 612, such as a gigabit Ethernet adapter. The NIC 612 is capable of connecting the computer 600 to other computing devices over the network 620. It should be appreciated that multiple NICs 612 may be present in the computer 600, connecting the computer to other types of networks and remote computer systems.

The computer 600 may be connected to a mass storage device 618 that provides non-volatile storage for the computer. The mass storage device 618 may store system programs, application programs, other program modules, and data, which have been described in greater detail herein. The mass storage device 618 may be connected to the computer 600 through a storage controller 614 connected to the chipset 606. The mass storage device 618 may consist of one or more physical storage units. The storage controller 614 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 600 may store data on the mass storage device 618 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 618 is characterized as primary or secondary storage, and the like.

For example, the computer 600 may store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the mass storage device 618 by detecting the physical states or characteristics of one or more particular locations within the physical storage units.

In addition to the mass storage device 618 described above, the computer 600 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 600.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

The mass storage device 618 may store an operating system 630 utilized to control the operation of the computer 600. According to one configuration, the operating system comprises the LINUX operating system. According to another configuration, the operating system comprises the WINDOWS® SERVER operating system from MICROSOFT Corporation. According to yet another configuration, the operating system may comprise the UNIX operating systems. It should be appreciated that other operating systems may also be utilized. The mass storage device 618 may store other system or application programs and data utilized by the computer 600, such as the code generator component 116, and/or any of the other software components, services, and data described above. The mass storage device 618 might also store other programs and data not specifically identified herein.

In one embodiment, the mass storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various routines described above with regard to FIGS. 2 and 3. The computer 600 might also include computer-readable storage media for performing any of the other computer-implemented operations described herein.

The computer 600 may also include one or more input/output controllers 616 for receiving and processing input from a number of input devices, such as a keyboard, a mouse, a touchpad, a touch screen, an electronic stylus, or other type of input device. Similarly, the input/output controller 616 may provide output to a display, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for generating client applications and, potentially, other aspects of the operation of a code generator component and other services have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A system, comprising:
one or more processors of one or more computers associated with a service provider network; and
memory to store computer-executable instructions that, when executed, cause the one or more processors to perform acts, comprising:
generating, via at least one of the one or more processors of the one or more computers, a client application based on one or more resources associated with functions identified based on a service model description, wherein the generated client application accesses the identified one or more resources using commands according to mapping information that maps the commands associated with the client application to the functions provided by one or more network services;
receiving a request for data from the client application, wherein the client application executes on a client computing device associated with a customer of the service provider network;
identifying one or more functions of the functions provided by the one or more network services based, at least in part, on the mapping information;
causing the one or more functions to be performed by the one or more network services to generate second data;
receiving the second data from the one or more network services; and
transmitting third data to the client computing device based, at least in part, on the second data.

2. The system of claim 1, wherein identifying the one or more functions of the functions provided by the one or more network services comprises directing one or more service chain handlers to acquire fourth data from a service model description that describes at least one of the one or more network services, and wherein causing the one or more functions to be performed is based, at least in part, on the fourth data.

3. The system of claim 1, wherein the acts further comprise:
storing the mapping information in a data store.

4. The system of claim 1, wherein the one or more processors are operative to provide at least one of the one or more network services, and wherein the at least one of the one or more network services is configured to:
receive a second request comprising at least one command and a pathname;
identify a function from the mapping information based on the second request;
perform the function to generate the second data.

5. The system of claim 1, wherein the acts further comprise:
analyzing a service model description, associated with the customer, to identify one or more resources associated with the one or more functions of the one or more network services;
generating program code based, at least in part, on the service model description and the one or more resources identified, wherein the generated program code accesses the identified resources using one or more commands according to the mapping information; and
generating the client application based, at least in part, on the service model description and the program code.

6. The system of claim 5, wherein the acts further comprise packaging the program code as a library that describes the service model description, and wherein the library is utilized by the client application to generate the request.

7. The system of claim 1, wherein the one or more processors provide functionality associated with at least one of the one or more network services.

8. A computer-implemented method, comprising:
generating, via one or more computing devices of a service provider network, a client application based on one or more resources associated with functions identified based on a service model description, wherein the generated client application accesses the identified one or more resources using commands according to mapping information that maps the commands associated with the client application to the functions provided by one or more network services;
receiving a request for data from the client application, wherein the client application executes on a client computing device associated with a customer of the service provider network;
identifying one or more functions of the functions provided by the one or more network services based, at least in part, on the mapping information;
causing the one or more functions to be performed by the one or more network services to generate second data;
receiving the second data from the one or more network services; and
transmitting third data to the client application based, at least in part, on the second data.

9. The computer-implemented method of claim 8, wherein identifying the one or more functions of the functions provided by the one or more network services comprises acquiring fourth data from a service model description that describes at least one of the one or more network services, and wherein causing the one or more functions to be performed is based, at least in part, on the fourth data.

10. The computer-implemented method of claim 8, further comprising:
storing the mapping information in a data store.

11. The computer-implemented method of claim 8, wherein the service provider network provides at least one of the one or more network services, and wherein the at least one of the one or more network services is configured to perform actions, comprising:
receiving a second request comprising at least one command and a pathname;
identifying a function from the mapping information based on the second request; and
performing the function to generate the second data.

12. The computer-implemented method of claim 8, further comprising:
analyzing a service model description, associated with the customer, to identify one or more resources associated with the one or more functions of the one or more network services;
generating program code based, at least in part, on the service model description and the one or more resources identified, wherein the generated program code accesses the identified resources using commands according to the mapping information; and
generating the client application based, at least in part, on the service model description and the program code.

13. The computer-implemented method of claim 12, further comprising generating a library describing the service model description based, at least in part, on the program code, and wherein the library is utilized by the client application to generate the request.

14. The computer-implemented method of claim 8, wherein the commands include one or more Hypertext Transfer Protocol (HTTP) commands that include one or more of an HTTP GET verb, an HTTP PUT verb, an HTTP POST verb, or an HTTP DELETE verb.

15. The computer-implemented method of claim 8, further comprising:
transmitting the client application to the client computing device associated with the customer.

16. A non-transitory computer-readable storage medium having computer-executable instructions stored thereupon which, when executed, cause one or more processors of one or more computers to perform acts, comprising:
generating a client application based on one or more resources associated with functions identified based on a service model description, wherein the generated client application accesses the identified one or more resources using commands according to mapping information that maps the commands associated with the client application to the functions provided by one or more network services;
transmitting the client application to a client computing device associated with a customer of a service provider network;
receiving a request for data from the client application, wherein the client application executes on one or more client computing devices associated with the customer of the service provider network;
identifying one or more functions of the functions provided by the one or more network services based, at least in part, on the mapping information;
causing the one or more functions to be performed by the one or more network services to generate second data;
receiving the second data from the one or more network services; and
transmitting third data to the client application based, at least in part, on the second data.

17. The non-transitory computer-readable storage medium of claim 16, wherein identifying the one or more functions of the functions provided by the one or more network services comprises directing one or more service chain handlers to acquire fourth data from a service model description that describes at least one of the one or more network services, and wherein causing the one or more functions to be performed is based, at least in part, on the fourth data.

18. The non-transitory computer-readable storage medium of claim 16, wherein the acts further comprise:
storing the mapping information in a data store.

19. The non-transitory computer-readable storage medium of claim 16, wherein the service provider network provides at least one of the one or more network services, and wherein the at least one of the one or more network services is configured to perform actions, comprising:
receiving a second request comprising at least one command and a pathname;
identifying a function from the mapping information based on the second request; and
performing the function to generate the second data.

20. The non-transitory computer-readable storage medium of claim 16, wherein the acts further comprise:
analyzing a service model description, associated with the customer, to identify one or more resources associated with the one or more functions of the one or more network services;
generating program code based, at least in part, on the service model description and the one or more resources identified, wherein the generated program code accesses the identified resources using commands according to the mapping information; and generating the client application based, at least in part, on the service model description and the program code.

\* \* \* \* \*